(12) United States Patent
Fujise et al.

(10) Patent No.: US 6,826,625 B1
(45) Date of Patent: Nov. 30, 2004

(54) NETWORK THAT CONVERTS DATA FROM A FIRST FORMAT INTO A SECOND FORMAT FOR COMMUNICATION, DATA COMMUNICATION APPARATUS CAPABLE OF COMMUNICATION OF DATA IN A FIRST FORMAT, COMMUNICATION SYSTEM INCORPORATING ALL THE ABOVE, AND CONTROL METHOD FOR ALL THE ABOVE

(75) Inventors: Shunichi Fujise, Abiko (JP); Takehiro Yoshida, Tokyo (JP); Shigeo Miura, Tokyo (JP); Teruyuki Nishii, Kashiwa (JP); Tomoyuki Takeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,391

(22) Filed: Dec. 17, 1999

(30) Foreign Application Priority Data

Dec. 25, 1998 (JP) .......................................... 10-371534

(51) Int. Cl.[7] .............................................. G06F 15/16
(52) U.S. Cl. ....................... 709/246; 709/241; 709/207; 709/240; 358/400; 358/402
(58) Field of Search ................................ 709/246, 241, 709/207, 240; 358/400, 402

(56) References Cited

U.S. PATENT DOCUMENTS

| 5,881,233 | A | | 3/1999 | Toyoda et al. ......... 395/200.48 |
|---|---|---|---|---|
| 5,999,598 | A | * | 12/1999 | Henrick et al. ........ 379/100.01 |
| 6,023,345 | A | * | 2/2000 | Bloomfield ................. 358/402 |
| 6,271,927 | B1 | * | 8/2001 | Kohtani et al. ............ 358/1.16 |
| 6,330,309 | B2 | * | 12/2001 | Toyoda et al. .............. 358/407 |
| 6,374,246 | B1 | * | 4/2002 | Matsuo .......................... 707/1 |
| 6,374,291 | B1 | * | 4/2002 | Ishibashi et al. ............ 358/400 |
| 6,735,740 | B2 | * | 5/2004 | Sakai et al. ................. 715/526 |

* cited by examiner

Primary Examiner—Hosain Alam
Assistant Examiner—Shabana Qureshi
(74) Attorney, Agent, or Firm—Fitzpatrick, Cella, Harper & Scinto

(57) ABSTRACT

In a communication system having a network capable of converting data in a first format into data in a second format to perform communication, and a data communication apparatus capable of performing communication of the data in the first format, the data communication apparatus transmits information indicating a priority level of an image such that the network can recognize the information, when transmitting the image to the network in the first format. The network converts the data in the first format transmitted by the data communication apparatus into data in the second format, and attaches priority level data, based on the information indicating the priority level of the received image, to the data converted into the second format when performing communication.

2 Claims, 14 Drawing Sheets

PRIORITY LEVEL = HIGHEST

○ PRIORITY LEVEL      ○ SET

NETWORK THAT CONVERTS DATA FROM A FIRST FORMAT INTO A SECOND FORMAT FOR COMMUNICATION, DATA COMMUNICATION APPARATUS CAPABLE OF COMMUNICATION OF DATA IN A FIRST FORMAT, COMMUNICATION SYSTEM INCORPORATING ALL THE ABOVE, AND CONTROL METHOD FOR ALL THE ABOVE

BACKGROUND OF THE INVENTION

1. Field of the Invention

The present invention relates to a network that converts data in a first format into data of a second format prior to performing communication, a data communication apparatus capable of performing communication using data in the first format, a communication system having all the above, and a control method for all the above.

2. Description of the Related Art

Hitherto, in a facsimile machine or a communication system, when information regarding a priority level need to be added to a facsimile message to be sent, an image corresponding to an applicable priority level, e.g. the words "HIGHEST PRIORITY" are written over on a document itself of the facsimile message (a document of an applicable page if there is more than one page), and the image is read by a scanner or the like before it is sent according to a standard facsimile sending procedure. A facsimile receiver receives the message in a standard manner and outputs the received message through a printer or other means.

An electronic mail system allows information regarding a priority level to be attached to a created electronic mail. For instance, when a sender of an electronic mail creates an electronic mail using mailer software for creating an electronic mail on an information and data apparatus such as a personal computer, the sender can set five priority levels, namely, "Highest", "High", "Average", "Low", and "Lowest", and attach one of these priority levels to the electronic mail when sending the mail. This enables a receiver of electronic mail to check at a glance the priority level of each mail on the mail itself or on a receiving list when the receiver receives them.

As electronic mail system becomes more widespread, there has been proposed a facsimile type electronic mail apparatus as disclosed in U.S. Pat. No. 5,881,233. This facsimile type electronic mail apparatus combines a function for performing communication of facsimile type data as in a conventional facsimile machine and a function for converting images read through a scanner or the like into data in an electronic mail format so as to permit transmission and reception of electronic mail converted into the electronic mail format.

Furthermore, there has also been announced a "storage and conversion type" system that receives sent data in the facsimile format via a network, then converts the received facsimile-format data into an electronic mail before sending the data to an electronic mail apparatus so as to allow the data to be accepted by the electronic mail apparatus. In this case, an electronic mail address of a receiving electronic mail apparatus is usually registered in advance.

In current communication systems or facsimile machines, however, there is no effective means available for attaching a priority level to a facsimile message to be sent. This has been posing a problem in that a priority level cannot be attached even when an electronic mail is sent to a terminal capable of receiving an electronic mail that includes information regarding a priority level.

SUMMARY OF THE INVENTION

Accordingly, an object of the present invention is to make it possible to notify a network, which converts data from a first format into a second format for communication, of a priority level of an image transmitted in the first format.

Another object of the present invention is to allow a priority level of data received in the first format to be attached when converting the received data from the first format into the second format.

Other objects of the present invention will become apparent from the following description and the accompanying drawings.

DESCRIPTION OF THE PREFERRED EMBODIMENT

In a first embodiment of the present invention, a document prepared with a predetermined mark indicating a priority level given at a predetermined position on the document by a user is read by a facsimile machine and directly transmitted through the facsimile machine to a network. When the network converts the received facsimile-format data into an electronic mail and sends the electronic mail to an electronic mail apparatus at a specified address, the network identifies the priority level data included in the received facsimile message, and attaches the priority level data to the electronic mail to be transmitted to the electronic mail apparatus.

Figure 1:
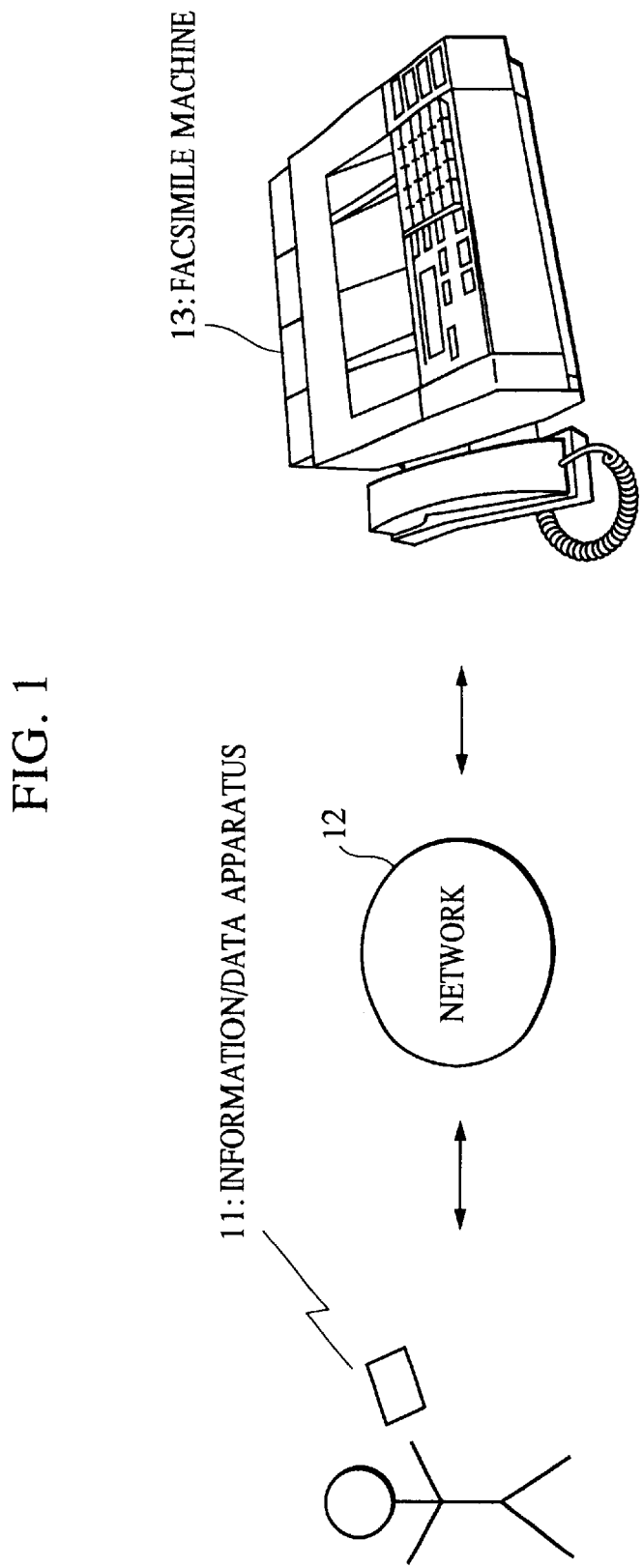
FIG. 1 is a schematic representation illustrating a configuration of a communication system according to an embodiment of the present invention.

FIG. 1 is a schematic representation showing an outline of a communication system according to the first embodiment of the present invention.

The communication system is constituted by a facsimile machine 13 capable of transmitting data in a facsimile format, a network 12 that converts data in the facsimile format received from the facsimile machine 13 into data in an electronic mail format and transmits the converted data to an information/data terminal 11 at a specified address. The information/data terminal 11, such as a personal computer, a workstation, or a mobile computer, is able to receive electronic mail.

The network 12 may be a public network or a LAN as long as it has the functions mentioned above.

The information/data terminal 11 is connected to a BBS host or an Internet server of a personal computer communication system through a LAN, a public line, or a dedicated line to receive electronic mail from the network 12.

The network 12, formed of a workstation, a hard disk, or the like, connected to a public line or a dedicated line provides users with a service in which it converts received data in the facsimile format into data in the electronic mail format and transmits the converted data to an information/data terminal at a designated address, and a variety of other services including simultaneous transmissive communication and specified-time transmission.

Figure 2:
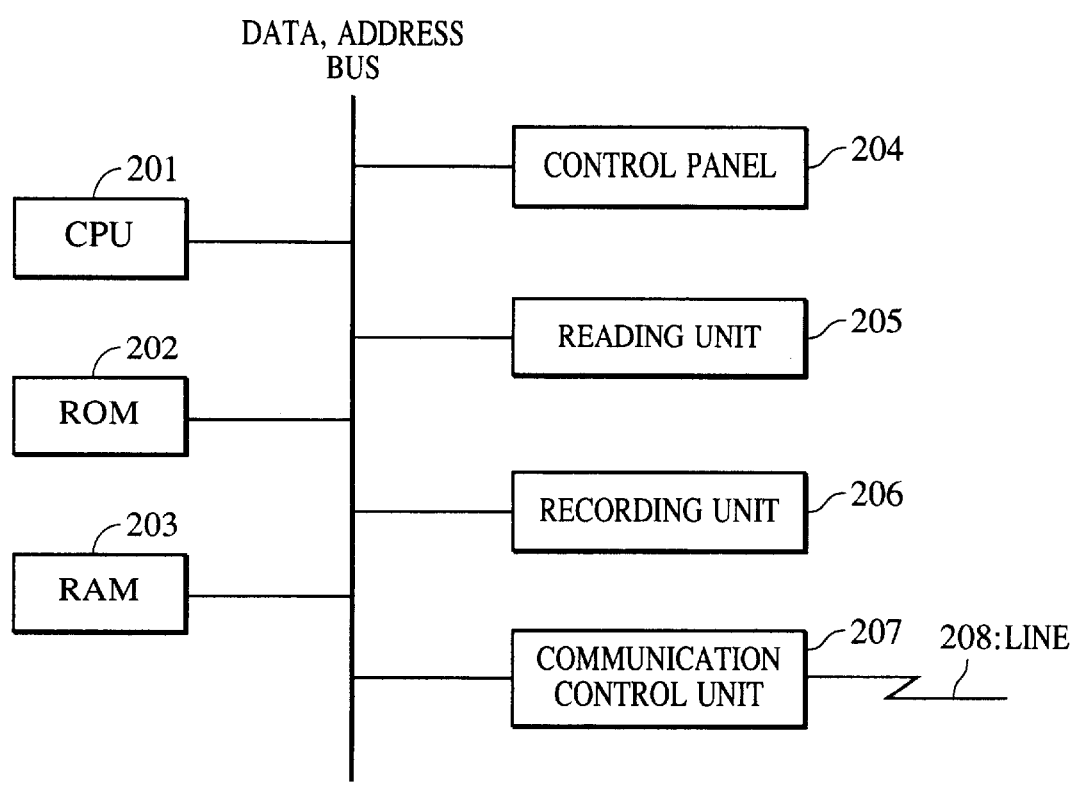
FIG. 2 is a block diagram showing an internal configuration of a facsimile machine in the embodiment of FIG. 1.

FIG. 2 is a block diagram showing a configuration of the facsimile machine 13 according to the first embodiment of the present invention.

The facsimile machine 13 may be one in common use. More specifically, the facsimile machine 13 is formed of a CPU 201 for controlling the machine, a ROM 202 for storing a program for controlling the machine, a RAM 203 for storing parameters or data necessary for operating the CPU 201 or the machine, image data or data files to be sent or received, character code format data, etc., a control panel 204 through which a user operates the machine to specify particular operations and that displays a state of the machine, a reading unit 205 for reading a facsimile document to be sent or a copy document as a color or monochrome image, a recording unit 206 for printing out a received facsimile document, a copy document, or a facsimile document in a color or monochrome mode, and a communication control unit 207 that performs control or transmitting and receiving of communication protocols for transmitting and receiving facsimile data, control of modulation and demodulation of signals, and that is connected to a public line 208 to carry out control of outgoing calls or detection of incoming calls.

In this embodiment, the configuration of a standalone facsimile machine has been shown; however, the present invention is applicable to any equipment having a facsimile communication function. For instance, the facsimile machine may be implemented by a combination of hardware equipped with a communication function on an information terminal, such as a personal computer, and application software having a facsimile function.

The facsimile-format data refers to image data or data files, character code format data, etc., compressed by MH, MR, or MMR specified by ITU-T Recommendation T.4.

Figure 3:
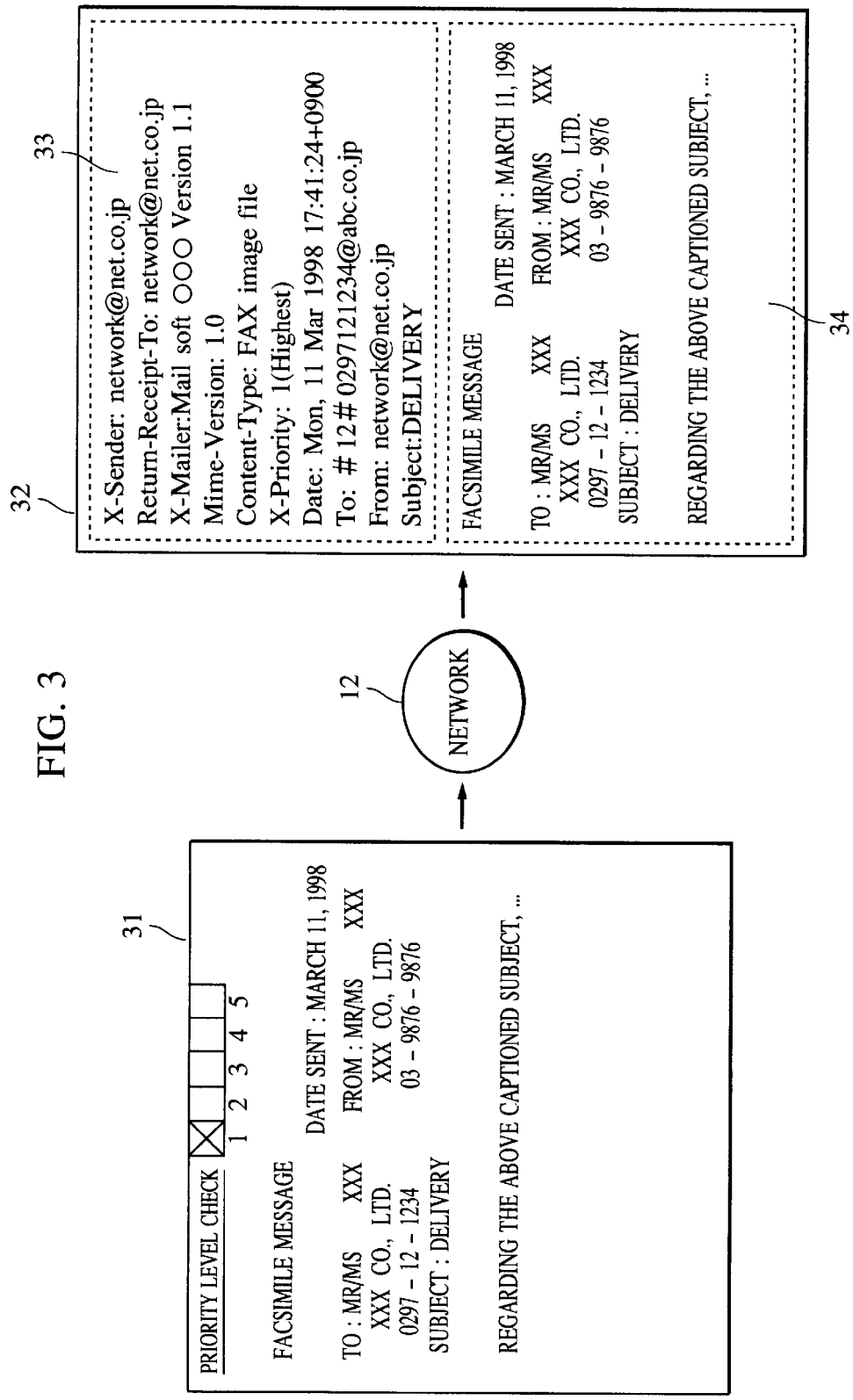
FIG. 3 is a schematic representation showing a specific example of a sent facsimile image and a received electronic mail in the embodiment of FIG. 1.

FIG. 3 is a schematic representation illustrating an example of a document transmitted from the facsimile machine 13 and an example of an electronic mail received by an electronic mail apparatus such as the information/data apparatus 11.

More specifically, a document 31 to be transmitted has a set of boxes for a user to check a box of a desired priority level of the facsimile to be sent. For example, there are five levels of priority, namely, "Highest"=1, "High"=2, "Average"=3, "Low"=4, and "Lowest"=5, from among which the user selects. In the example of FIG. 3, "Highest"=1 has been checked.

A portion below the priority level check boxes presents the contents of a regular facsimile document to be sent. The facsimile machine 13 reads the facsimile message document using the reading unit 205, and codes the document into the coding formats of MH, MR, or MMR specified by ITU-T Recommendation T. 4 before transmitting the document to the network 12.

The network 12 converts the facsimile-format data of the received document 31 into an electronic mail 32 and transmits the electronic mail 32 to the information/data apparatus 11. The electronic mail 32 received by the information/data apparatus 11 is formed of a header 33 and a message body 34 as in a regular electronic mail.

The header 33 mainly includes a mail address of a sender (the network 12 in this case) or a destination address (an electronic mail address of the information/data apparatus 11 in this case), a version of that application software (mailer software) of the network 12 for sending an electronic mail, an attribute indicating a content type (a facsimile-format image data file in this case) of the message body 34, and information indicating a priority level of this electronic mail (X-priority). The header 33 is usually created by data in a character code format such as an ASCII code.

At this time, in the header 33, "Highest" (1), checked in the facsimile document to be sent, is attached as the priority level. The priority level data is displayed on a display of the information/data apparatus 11 by the application software or mailer software for receiving an electronic mail on the information/data apparatus 11 that has received the electronic mail 32, or attached and printed when the electronic mail is printed out.

The message body 34 is composed of data of the received facsimile document 31 to be sent, the data having been filed and attached to the electronic mail. Specifically, data that has been coded using MH, MR, MMR, etc., is filed. The filing format uses TIFF-FX or the like. The information/data apparatus 11 that has received the message is supposed to have application software or viewer software for expanding and displaying a file of the message body 34 on a display, or printing out the file.

When transmitting the document 31 from the facsimile machine 13 to the network 12, a user carries out an operation according to a conventional operation method similar to that for transmitting a facsimile. At this time, the user calls a number, for example, 12345678#12#9876, for connection to the network 12. In this example, "12345678" indicates a number for connection to the network, and "12" denotes an electronic mail conversion and transmission service. Furthermore, "9876" corresponds to an electronic mail address of a party to which the electronic mail is to be transmitted, and this number is supposed to be registered at the network in advance.

Alternatively, the user may adopt a method for operating the control panel 204 such that a call is made at the number "12345678" first to accomplish a connection to the network 12, then a number "#12#9876" is sent once the connection to the network 12 has been verified. At this time, the facsimile machine 13 sends a signal, e.g. a DTMF signal, corresponding to "#12#9876" to the network 12.

Figure 4:
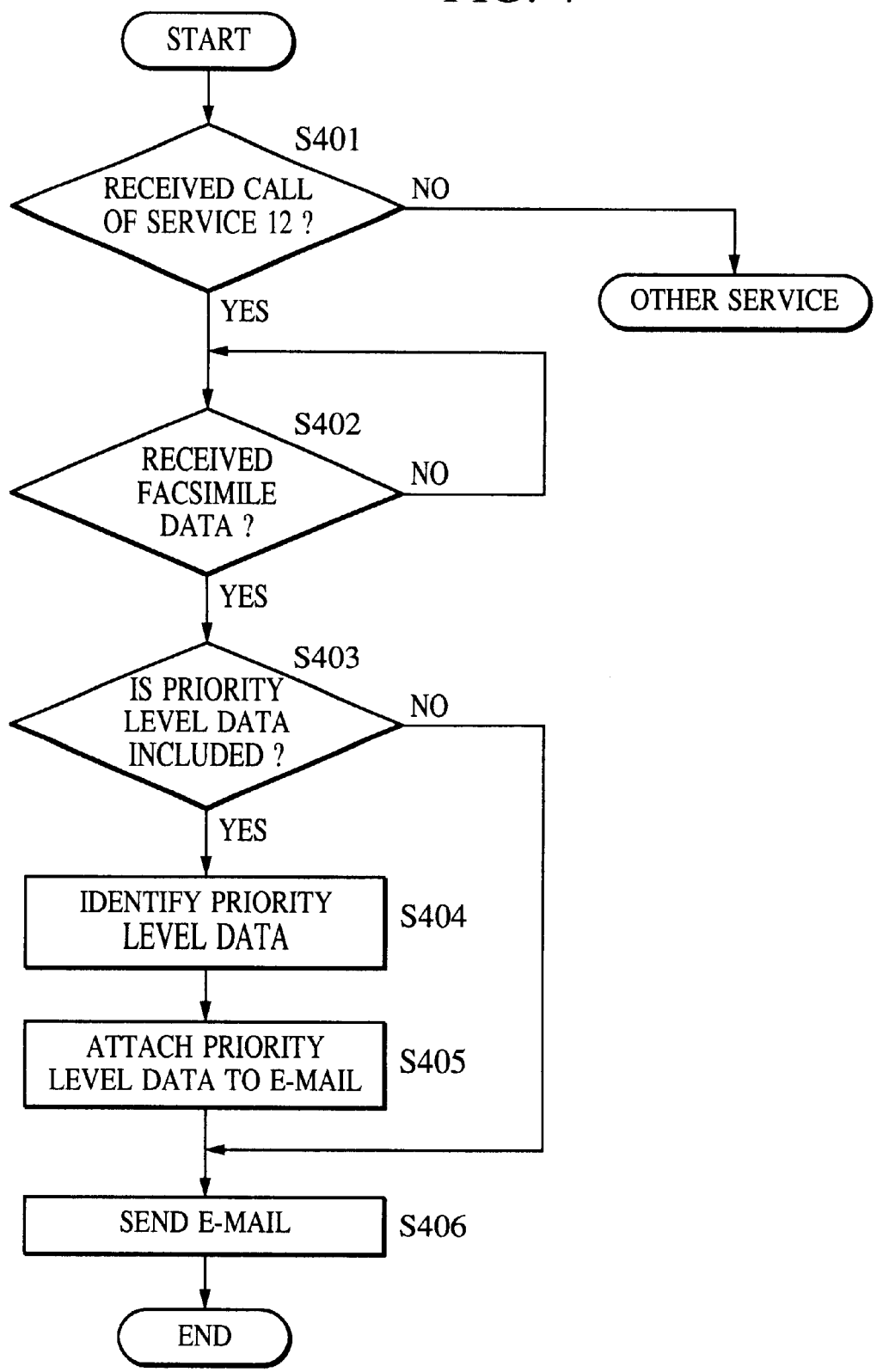
FIG. 4 is a flow chart illustrating an operation of a network in a first embodiment of the present invention.

Referring now to FIG. 4, an operation of the network 12 according to the first embodiment of the present invention will be described. FIG. 4 is a flow chart illustrating the operation of the network 12.

In step S401 shown in FIG. 4, when the network 12 accepts a call, it monitors if the call has "12" attached thereto, which is a number denoting a demand for an electronic mail convert-and-send service for receiving data in the facsimile format and converting the received data into data in the electronic mail format and sending it.

If the network 12 receives a call with "12" attached thereto, then the network 12 receives the facsimile data in the following step S402. If the call is not the one with "12", then the network 12 carries out another service such as normal facsimile communication.

In steps S403 and S404, the network 12 checks if priority level data is contained in the received facsimile data 31, and if the priority level data is contained, then the network 12 recognizes the contents.

More specifically, if the received facsimile data is based on, for example, the MH, MR, or MMR coding method specified by ITU-T Recommendation T.4, then the network 12 decodes the data to produce raw image data.

At this time, it is already known that the priority level check boxes of the document lie in the first several lines, e.g. five lines, in the vertical scanning direction; hence, only the first five lines are decoded when there is no need to decode the entire received data.

The position in the horizontal scanning direction is also known, so that the percentage of presence of a black image in a predetermined portion is recognized. If the percentage of the black image at the position of Priority level=1 is high, then it is recognized that the priority level of the received data is "Highest (1)", or if the black image at the position of Priority level=2 is high, then it is recognized that the priority level thereof is "High (2)".

Thus, the network 12 is able to identify received priority level data by a simple processing method.

If no priority level data is present, that is, if no check is found in the priority level check boxes, then the network 12 transmits the electronic mail, which has been converted into the facsimile data, directly to the information/data apparatus 11 without attaching priority level data (step S406). As an alternative, if no priority level data is present, then default priority level data may be registered in the network 12 beforehand, and if no priority level data is present, then the default priority level data may be attached to an electronic mail when transmitting the electronic mail.

If the priority level data is present, then the network 12 carries out processing for attaching the priority level data, which has been recognized in step S404, to the electronic mail in the following step S405. More specifically, the network 12 generates the header 33 of the electronic mail that includes the recognized priority level data as shown in FIG. 3.

In step S406, the electronic mail 32, composed of the header 33 based on the received priority level data and the message body 34 is transmitted to the information/data apparatus 11 according to an electronic mail address that has been registered beforehand. This terminates the operation of the network 12 of this embodiment.

Thus, the facsimile machine 13 can transmit a message with the priority level data attached thereto in the electronic mail format simply by facsimile-transmitting the message to the network 12 without the need for adding any change to its conventional configuration.

This embodiment has shown a case wherein the set of boxes for the user to check an appropriate priority level box of a facsimile message is located at the top of the document 31 to be sent. If, however, there are a plurality of pages of a facsimile document and if a check is given in the set of boxes on only the first page, then the checked priority level may be handled as indicating the priority level of all pages or of the first page.

If a user wishes to assign different priority levels to individual pages, then the user may check an appropriate priority level box on each page. The network 12 will be able to recognize the different priority levels of the respective pages and attach the different priority levels to the respective pages of the electronic mail 32 which is to be sent. In this case, the highest priority level among the priority levels of all pages will be adopted as the priority level of the entire electronic mail 32.

A second embodiment of the present invention will now be described.

In the second embodiment of the invention, a document prepared with a predetermined mark indicating a priority level, given at a predetermined position on the document by a user, is read by a facsimile machine, and a portion indicating the priority level is subjected to special processing to recognize the priority level data. The recognized priority level data and the body of the document are facsimile-transmitted to a network. The network converts the data of the body of the received document from the facsimile format into an electronic mail, adds the received priority level data to the electronic mail, and transmits the electronic mail to an electronic mail apparatus or an information/data apparatus.

The second embodiment is also formed of the information/data apparatus 11, the network 12, and the facsimile machine 13, as shown in FIG. 1. A CPU 201 of the facsimile machine 13 has a function for recognizing the priority level data of a document read by a reading unit 205. The rest of the configuration of the second embodiment is identical to that shown in FIG. 2, and the description thereof will not be repeated.

In the second embodiment also, an example of a document to be sent and an example of a received electronic mail as shown in FIG. 3 will also be described.

Referring now to the flow chart of FIG. 5, the operation of the facsimile machine 13 according to the second embodiment of the invention will be described. In addition, the operation of the network 12 will be described in conjunction with the flow chart of FIG. 6.

Figure 5:
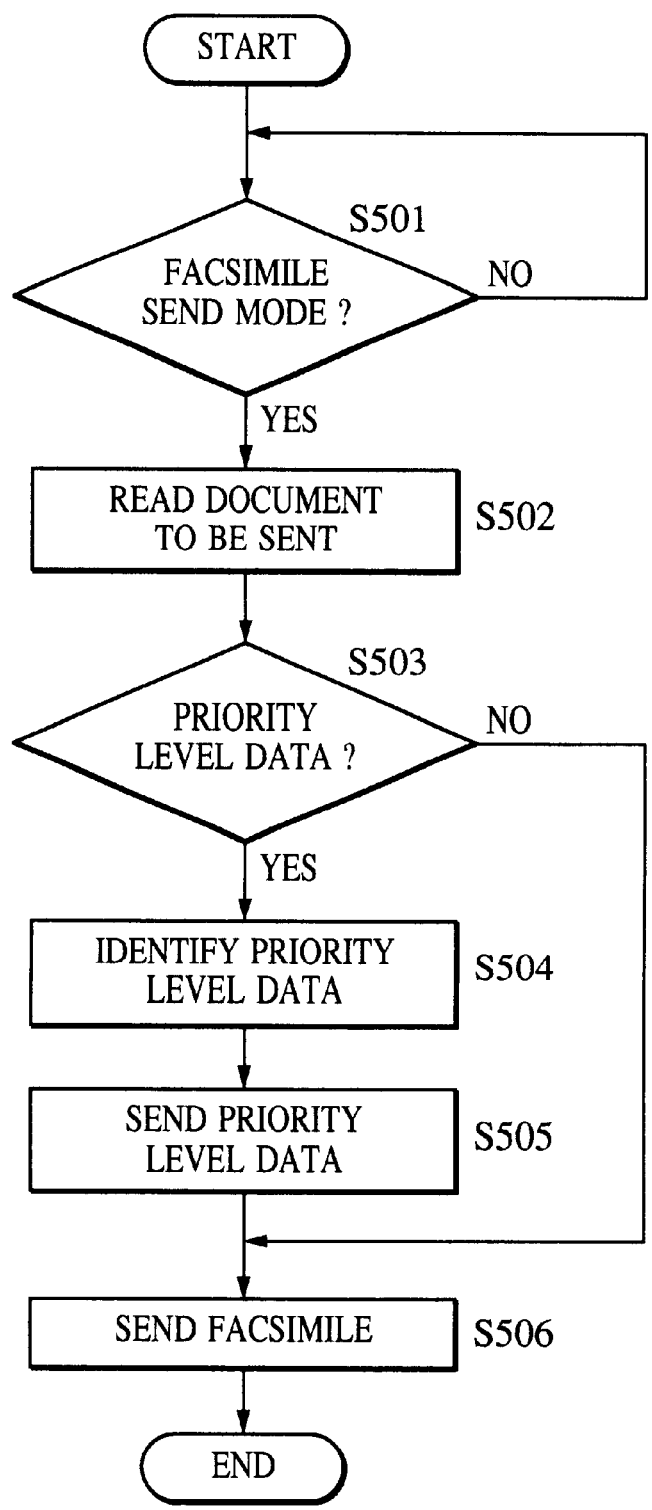
FIG. 5 is a flow chart illustrating an operation of a facsimile machine in a second embodiment of the present invention.

In step S501, shown in FIG. 5, when a facsimile machine 13 is in a facsimile send mode, it begins an operation for sending a message. For instance, when a user sets a document to be sent on the reading unit 205 and originates a call by pressing keys on a control panel 204 or by performing another similar operation, the facsimile machine 13 begins operation in the facsimile send mode.

At this time, as in the case of the first embodiment, the user calls, for example, "12345678#12#9876" to connect to the network 12. The number "12345678" is for accomplishing connection to the network, and the number "12" indicates the electronic mail convert-and-send service. The number "9876" corresponds to an electronic mail address of an addressee, which is supposed to be registered in the network beforehand.

In step S502, the document to be sent is read by the reading unit 205 in the same manner as in a typical facsimile machine.

At this time, in steps S503 and S504, the CPU 201 checks whether priority level data is present in the document to be sent, and if the information is present, then the CPU 201 recognizes the contents thereof. To be more specific, in the same manner as the method of, for example, the first embodiment, raw image data of the document to be sent, which is obtained when the document is read by the reading unit 205, is analyzed by the CPU 201. It is known in advance that a checked priority level box on the document will be found in the first several lines, e.g. five lines, in the vertical scanning direction, so that only the five lines will be analyzed. The position thereof in the horizontal scanning direction is also known, and the percentage of the presence of a black image in a predetermined portion will be recognized. If the percentage of the black image at the position of Priority level=1 is high, then it is recognized that the priority level of the received data is "Highest (1)", or if the black image at the position of Priority level=2 is high, then it is recognized that the priority level thereof is "High (2)".

Thus, the facsimile machine 13 is able to recognize the priority level data marked on the document to be sent, by a simple processing method.

As an alternative method for recognizing the priority level data, commonly used optical character recognition (hereinafter referred to simply as "OCR") processing may be employed.

If no priority level data is present, that is, if no check is found in the priority level check boxes, then the document that has been read by the reading unit 205 is converted into facsimile data based on MH, MR, MMR, etc. and the converted facsimile data is transmitted directly to the network 12 without attaching or transmitting priority level data (step S506).

If the priority level data is present, then processing for transmitting the priority level data identified in step S504 to the network 12 (step S505) is implemented. More specifically, the priority level data is converted into data in, for example, the character code format and the converted data is transmitted to the network 12.

For instance, if the recognized priority level is "Highest (1)", then an ASCII code corresponding to "1" is used, or if it is "High (2)", then an ASCII code corresponding to "2" is used as the priority level data.

If the facsimile data of the body of the document to be sent is not in the character code format, that is, if the facsimile data is based on one of, for example, MH, MR, and MMR, then the priority level data will be facsimile-transmitted in a different mode. Furthermore, if the facsimile data of the body of the document to be sent is in the character code format, then the priority level data can be attached to the data of the body and facsimile-transmitted in the same mode.

In step S506, the facsimile data of the body of the document to be sent is transmitted. This terminates the operation of the facsimile machine 13 in this embodiment.

The operation of the network 12 will now be described. In step S601 of FIG. 6, when the network 12 accepts a call, it monitors if the received call is the one with "12" attached thereto that denotes a demand for an electronic mail convert-and-send service for receiving data in the facsimile format and converting the received data into data in the electronic mail format and sending it.

If the call is not one with "12" attached thereto, then the network 12 carries out another service such as normal facsimile communication.

If the network 12 receives a call with "12" attached thereto, then it receives facsimile data in step S602.

In steps S603 and S604, the network 12 checks if priority level data is present in the received facsimile data, and if the priority level data is present, then the network 12 recognizes the contents.

To be more specific, the network 12 analyzes the priority level data sent in the character code format from the facsimile machine 13. Specifically, when the priority level data is sent in, for example, the ASCII code, and if an analyzed code indicates "1", then the network 12 recognizes the priority level as "Highest (1)". If the analyzed code indicates "2", then the priority level is recognized as "High (2)".

In step S605, the network 12 carries out processing for attaching the priority level data, which has been recognized in step S604, to the electronic mail. More specifically, the network 12 generates the header 33 of the electronic mail that includes the recognized priority level data, as shown in FIG. 3.

In this case, the priority level data transmitted from the facsimile machine 13 to the network 12 is in the character code format. Therefore, the network 12 does not have to convert the priority level data, which is in the character code format, and the network 12 can directly insert the priority level data into the header 33 to send it. This permits the volume of processing of the network 12 to be reduced.

In step S606, electronic mail 32 composed of the header 33 corresponding to the received priority level data and the message body 34 is transmitted to the information/data apparatus 11 according to an electronic mail address which has been registered beforehand. This terminates the operation of the network 12 of this embodiment.

In step S603, if no priority level data is received, then the network 12 generates the header without attaching the priority level data or creates a header with the priority level data that has been registered as a default in the network, composes electronic mail formed of the header and the message body obtained by converting received facsimile data into electronic mail data, and then transmits the composed electronic mail.

As set forth above, the facsimile machine 13 can transmit conventional facsimile data together with priority level data to the network 12. In other words, the facsimile machine 13 can transmit a message with priority level data attached thereto in the electronic mail format without any problems.

As in the case of the first embodiment, the second embodiment also refers to the example wherein the set of boxes for a user to check an appropriate priority level box of a facsimile message is located at the top of the document 31 to be sent. If, however, there are a plurality of pages of a facsimile document and if a check is given in the set of boxes on only the first page, then the checked priority level may be handled as indicating the priority level of all pages or of the first page.

If a user wishes to assign different priority levels to individual pages, then the user may check an appropriate priority level box on each page. The network 12 will be able to recognize the different priority levels of the respective pages and attach the different priority levels to the respective pages of the electronic mail 32 to be sent. In this case, the highest priority level among the priority levels of all pages will be adopted as the priority level of the entire electronic mail 32.

It is alternatively possible to enable a user to select through a control panel 204 whether the processing of the embodiment should be implemented. More specifically, a hardware type switch or a software type switch involving an LCD may be provided on the control panel 204 so as to allow the user to select ON or OFF of, for example, "Priority level data send mode". With this arrangement, when the user selects "ON", the above processing is implemented; when the user selects "OFF", a document that has been read is directly facsimile-transmitted to the network 12 without carrying out the processing of recognizing and transmitting priority level data described above, even if there is a check in the set of priority level check boxes on the document to be sent.

A third embodiment of the present invention will now be described.

In the first and second embodiments, descriptions have been given of a method wherein the set of priority level check boxes is provided on a document to be sent and a checked priority level is recognized by the network 12 or the facsimile machine 13, that is, a method wherein a priority level is entered through the document to be sent. In the third embodiment, a priority level is entered through a control panel 204 of a facsimile machine 13, and the facsimile machine 13 transmits the entered priority level to a network 12.

A system of the third embodiment is also formed of an information/data apparatus 11, a network 12, and a facsimile machine 13, as shown in FIG. 1. Furthermore, a display function and pushbuttons, as shown in FIG. 7, are added to the control panel 204 of the facsimile machine 13.

The third embodiment also uses the example of received electronic mail shown in FIG. 3.

Figures 7, 8:
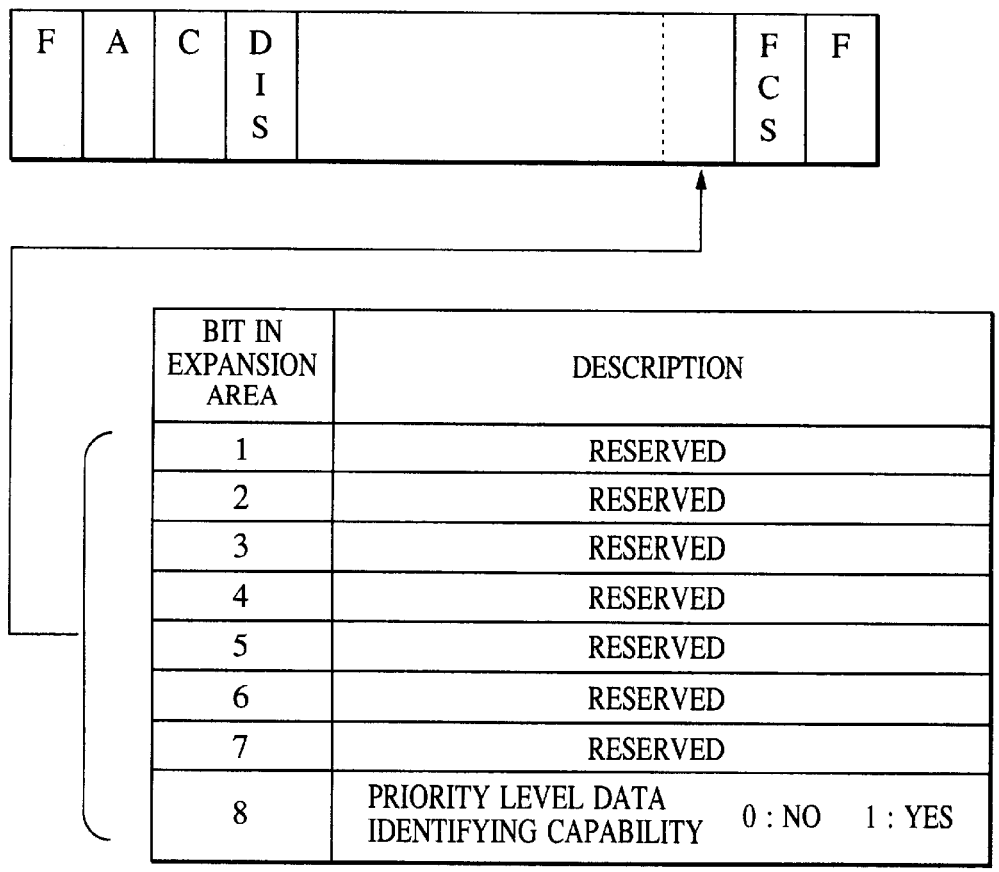
FIG. 7 is a top plan view showing a part of a configuration of a control panel in a third embodiment of the present invention.
FIG. 8 is a schematic representation illustrating a format of a DIS signal and its expansion area, and a definition of each bit in a fourth embodiment of the present invention.

Referring now to FIG. 7, a method for entering a priority level through the control panel 204 will be described. It is assumed that the control panel 204 has an LCD for displaying characters, a pushbutton for selecting a priority level (a priority level pushbutton), and a set pushbutton for confirming a selection.

First, when the priority level pushbutton is pressed, the LCD displays, for example, "Priority level=Highest". To select this "Priority level=Highest", the set pushbutton is pressed in the next step. If other priority level need to be selected, the priority level pushbutton is pressed again before pressing the set pushbutton. This will cause the LCD to display the next priority level "Priority level=High".

Each time the priority level pushbutton is pressed as mentioned above, the selective priority level displayed on the LCD can be changed. When the set pushbutton is pressed at the end, if, for example "Priority level=Highest" is displayed on the LCD, then this displayed priority level will be selected and confirmed, and the control panel 204 will be set back into a standby mode. This means that "Priority level=Highest" has been entered to the facsimile machine 13.

The above describes an example of the method for entering a priority level through the control panel 204. The first priority level to be displayed does not have to be "Highest"; it may be, for example, "Average". In this case, if pushbuttons are available for shifting the priority level toward higher levels and lower levels, respectively, then the pushbuttons can be pressed for changing the display to change a priority level to be selected. For instance, when the pushbutton for a higher level is pressed, "Average" will be followed by "High" and "Highest" in order; when the pushbutton for a lower level is pressed, "Average" will be followed by "Low" and "Lowest" in order.

Further alternatively, instead of providing the priority level pushbuttons, a function pushbutton may be provided. The function pushbutton is pressed to cause a menu to be displayed on the LCD, the menu including the priority levels to be selected, so that a desired priority level may be selected in the same manner as set forth above.

As another alternative, rather than providing the set pushbutton, a start pushbutton for starting facsimile transmitting operation may be used to provide the function of the foregoing set pushbutton.

Likewise, in place of the LCD, a plurality of LEDs may be provided to cause an LED corresponding to a selected priority level to light. In this case, each time the priority level pushbutton is pressed, a different LED is lit, and the moment the set pushbutton is pressed, the priority level corresponding to the LED that is ON at that moment will be selected.

These operations may be carried out during the facsimile transmission or before the facsimile transmission to make the presettings.

As set forth above, when a priority level is entered through the control panel 204 of the facsimile machine 13, the entered priority level data can be transmitted.

Processing for transmitting priority level data will now be described in conjunction with FIG. 5 as in the case of the second embodiment.

First, in step S501, shown in FIG. 5, the facsimile machine 13 operates in the same manner as that described in the second embodiment expect that it is assumed that priority level data has been entered through the control panel 204, as explained above.

In step S502, a document to be sent is read by a reading unit 205, as in the case of a typical facsimile machine. In steps S503 and S504, it is checked whether priority level data has been entered through the control panel 204, and if priority level data has been entered, then the contents thereof are recognized.

If no priority level data has been entered, that is, if no operation for setting a priority level has been performed through the control panel 204, then the document to be sent that has been read by the reading unit 205 is converted into facsimile data based on MH, MR, MMR, etc., and the converted data is directly transmitted to the network 12 without attaching or transmitting priority level data in step S506.

If priority level data has been entered, then the processing of step S505 and subsequent steps will be implemented as in the case of the second embodiment. The priority level data recognized in step S504 and facsimile data of the body of the document to be sent is transmitted to the network 12. This completes the operation of the facsimile machine 13 of this embodiment.

Figure 6:
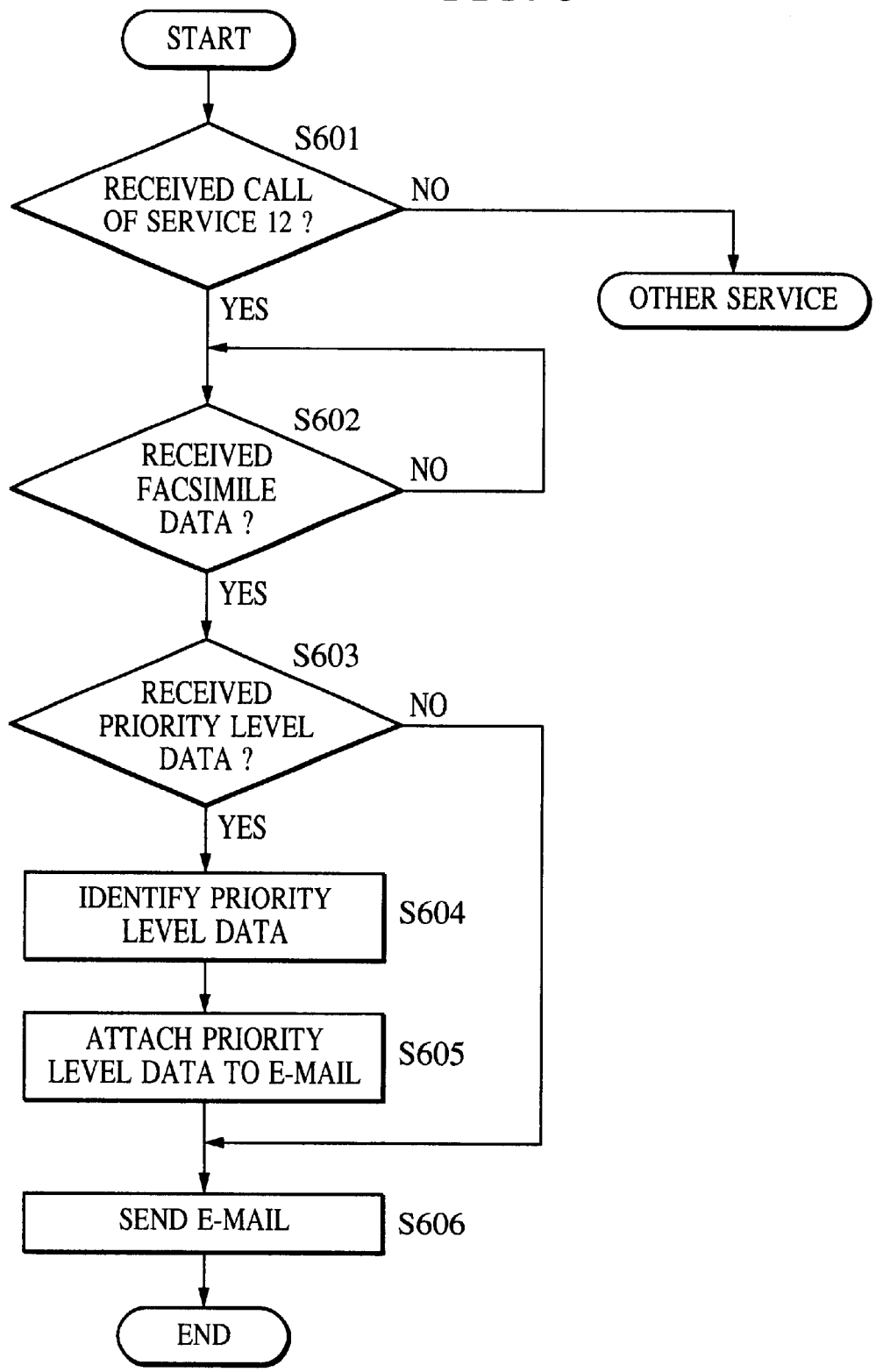
FIG. 6 is a flow chart illustrating an operation of a network in the second embodiment.

The operation of the network 12 is identical to the operation in the second embodiment described with reference to FIG. 6.

Thus, according to the present embodiment, a priority level can be entered through the control panel 204. In other words, a user can easily enter a priority level, and the facsimile machine 12 can positively recognize entered priority level data. Particularly, it becomes possible to send a document carrying no priority level data in a regular manner without providing the document with a set of priority level check boxes.

As in the case of the first and second embodiments, the third embodiment also enables a priority level to be entered in the middle of transmission when a document to be sent includes a plurality of pages. More specifically, when transmission is begun with a priority level set to "Highest" through the control panel 204 before starting the transmission, each page will be sent with the "Highest" priority level. If, however, the control panel 204 is operated to change the set priority level to, for example, "Average" in the middle of the transmission, then the remaining pages from that point will be sent with the priority level "Average."

The foregoing embodiments show the examples wherein, when transmitting facsimile-format data, the facsimile machine 13 reads a facsimile document and converts a body of the read message into a coding format such as MH, MR, or MMR before transmitting the message. Alternatively, however, the message may be transmitted in terms of a data file, data in a character code format, etc. specified by, for example, ITU-T Recommendation T.4 or T.30.

Alternatively, the priority level data set forth above may be transmitted as an attribute value of facsimile data to be transmitted rather than transmitting it as data in the facsimile format. In other words, it becomes possible to newly add the foregoing priority level data to a file attribute in a binary file transfer (BFT) mode described in, for example, ITU-T Recommendation T. 434, so that the facsimile machine 13 adds the priority level data as one of the file attributes and sends it to the network 12.

When the facsimile machine 13 sends such data to the network 12, it is also possible to newly provide image data or character code format data with an expansion attribute value for priority level data to accommodate the priority level data at the time of transmission.

A fourth embodiment of the present invention will now be described.

A system of the fourth embodiment is also formed of an information/data apparatus 11, a network 12, and a facsimile machine 13, as shown in FIG. 1.

The fourth embodiment will also use the example of received electronic mail as shown in FIG. 3.

Figure 9:
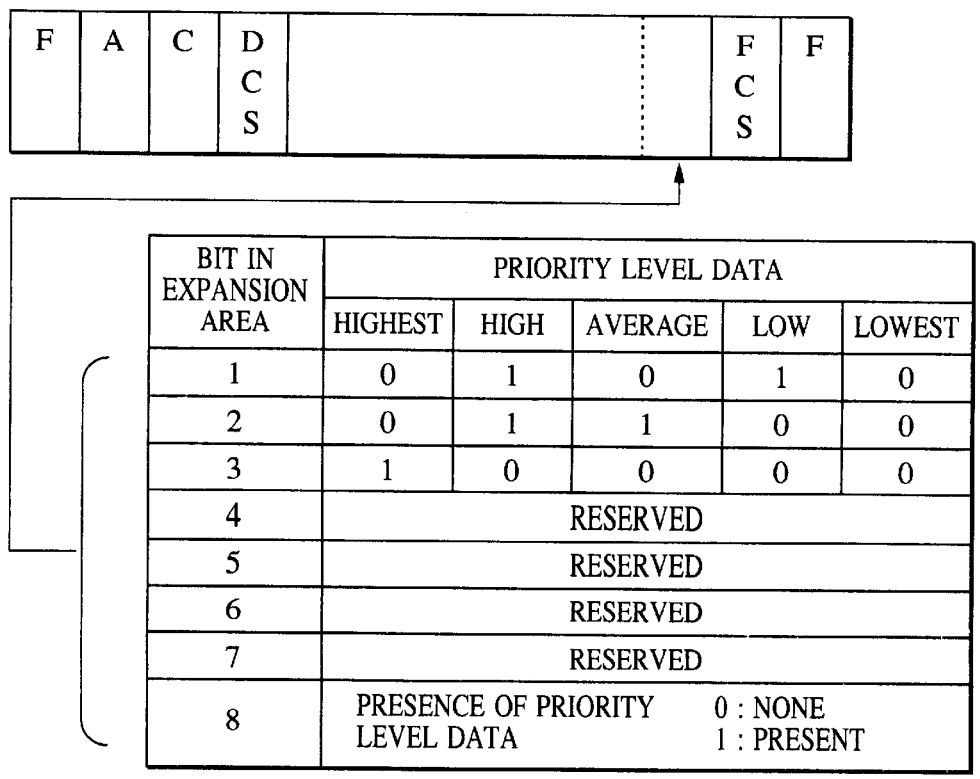
FIG. 9 is a schematic representation illustrating a format of a DCS signal and its expansion area, and a definition of each bit in the fourth embodiment of the present invention.

FIG. 8 is a schematic representation illustrating a format of a DIS signal (digital identification signal) of the signals involved in a facsimile control procedure and its expansion area, and a definition of each bit in the fourth embodiment. FIG. 9 is a schematic representation illustrating a format of a DCS signal (digital command signal) of the signals involved in the facsimile control procedure and its expansion area, and a definition of each bit in the fourth embodiment.

Figure 10:
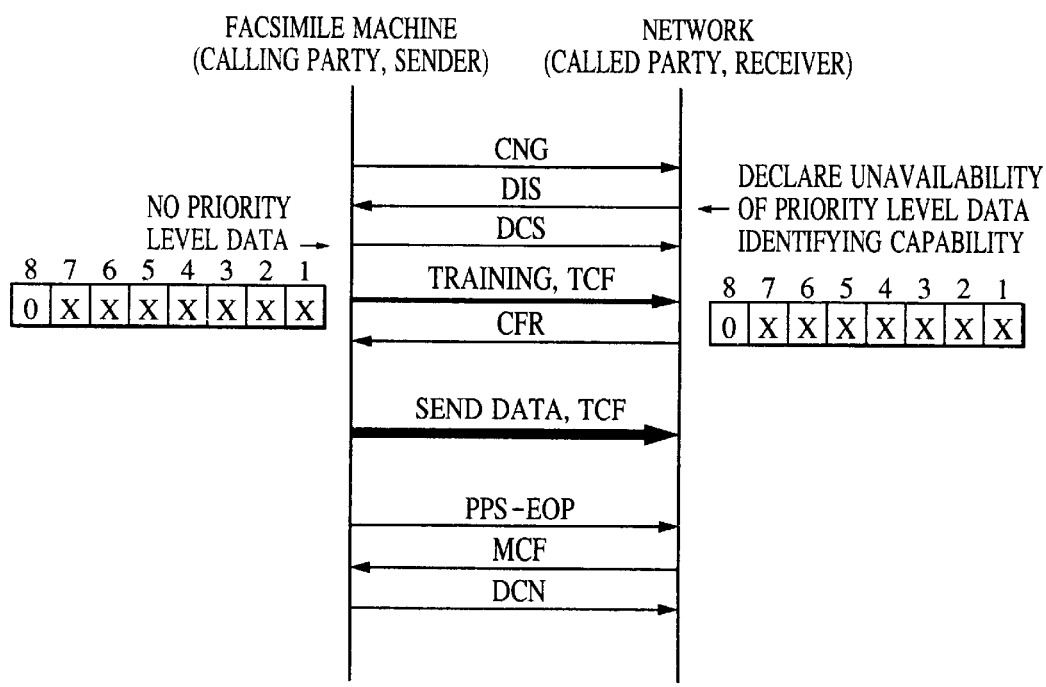
FIG. 10 is a schematic representation illustrating an operation sequence of the fourth embodiment.
Figure 11:
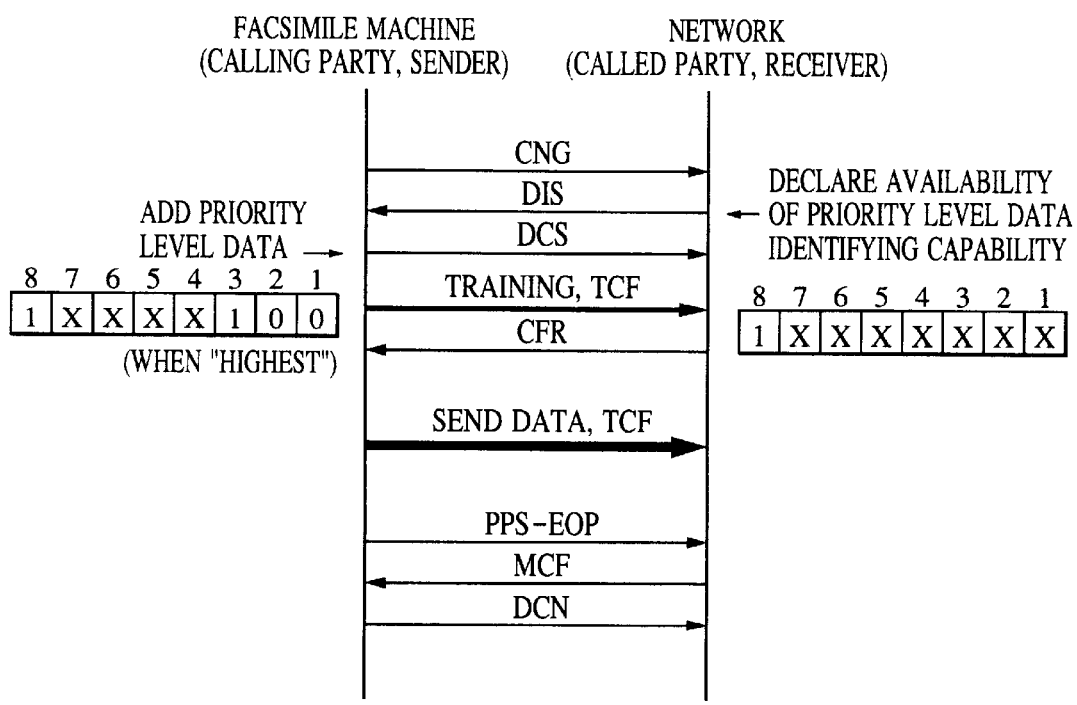
FIG. 11 is a schematic representation illustrating another operation sequence of the fourth embodiment.

FIGS. 10 and 11 are schematic representations illustrating operation sequences of the facsimile control procedure observed between the network 12 and the facsimile machine 13 in the fourth embodiment.

Figure 12:
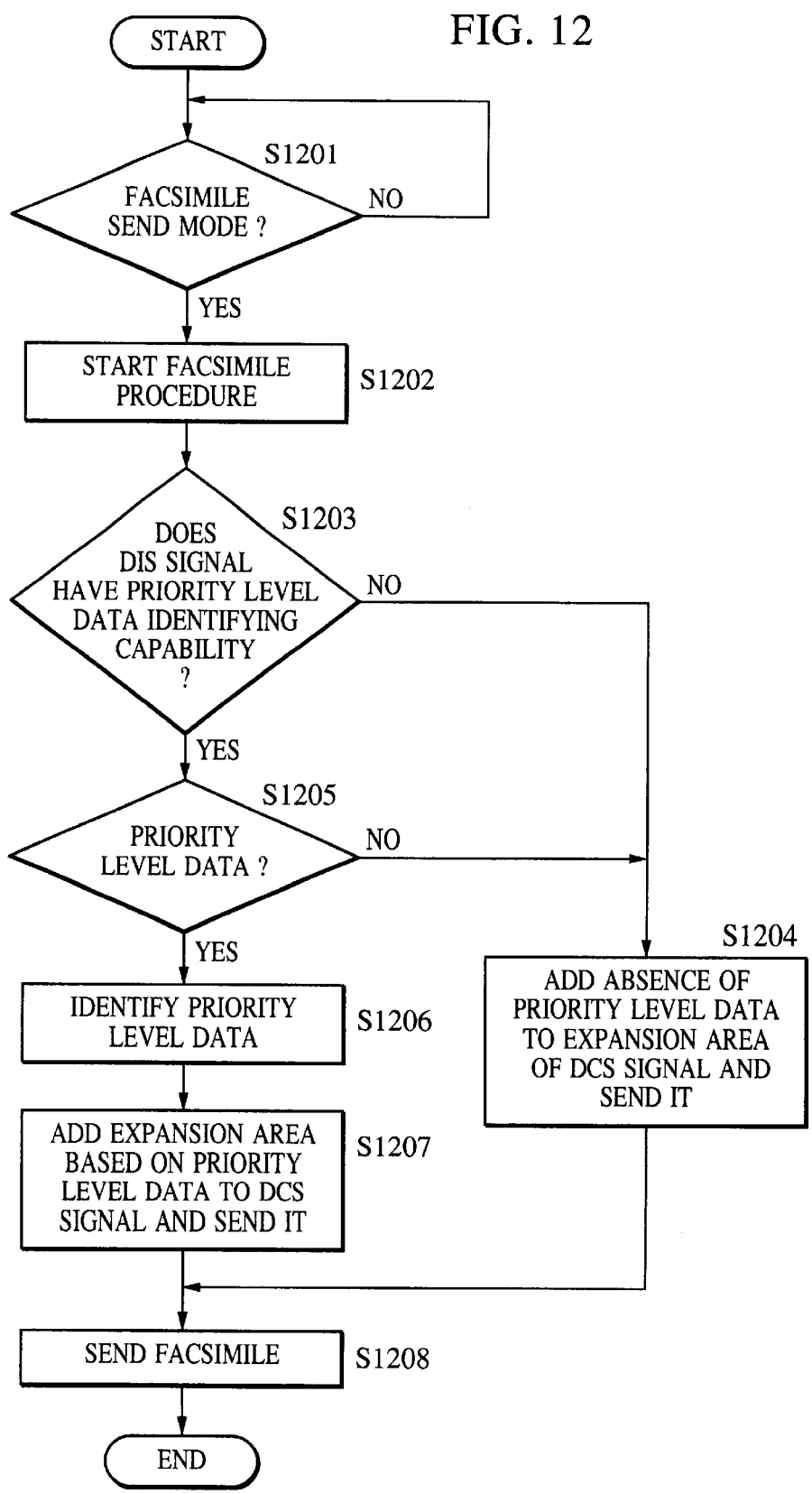
FIG. 12 is a flow chart showing an operation of a facsimile machine in the fourth embodiment.
Figure 13:
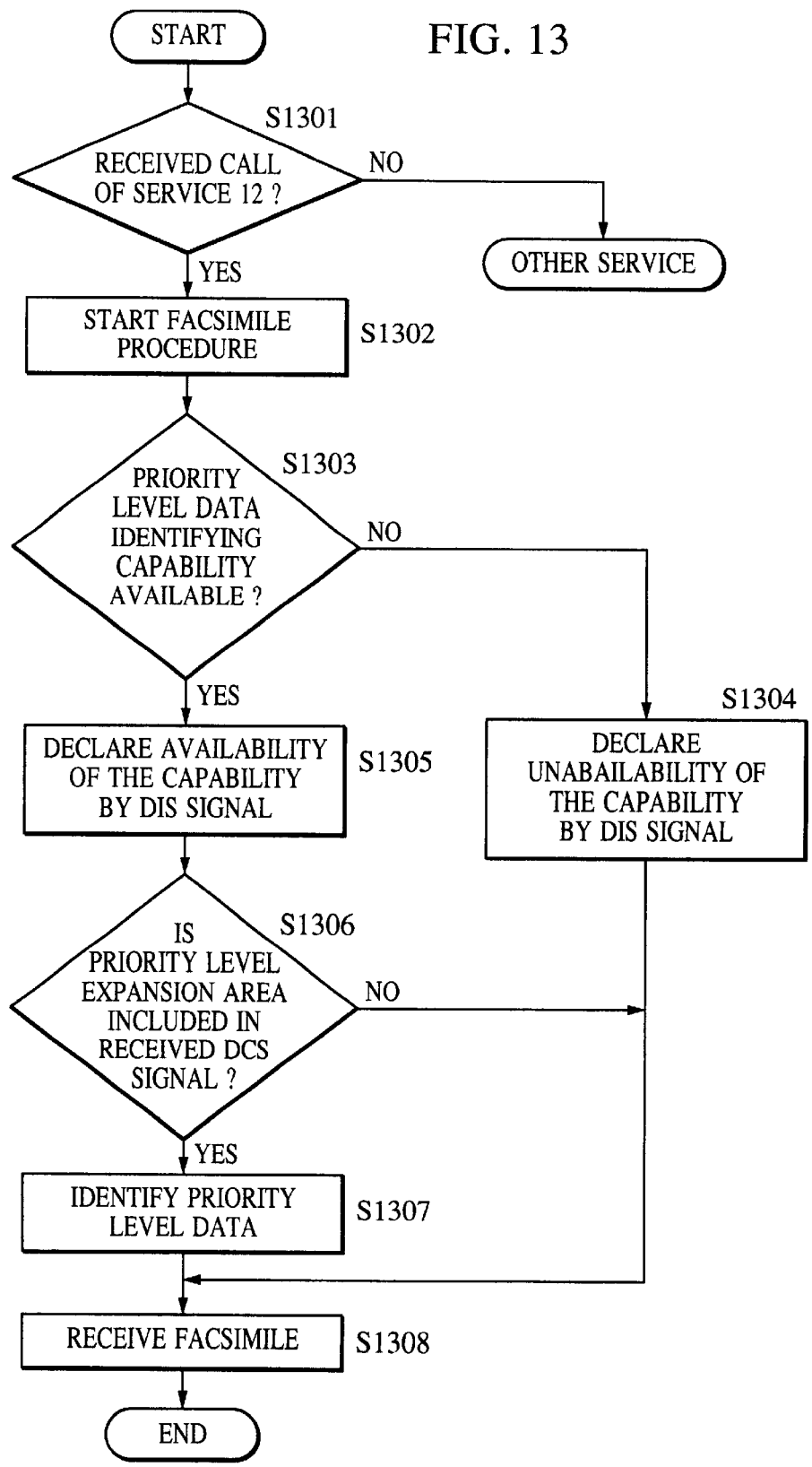
FIG. 13 is a flow chart showing an operation of a network in the foregoing fourth embodiment.

FIG. 12 shows a flow chart illustrating the operation of the facsimile machine 13 in the fourth embodiment, and FIG. 13 shows a flow chart illustrating the operation of the network 12 in the fourth embodiment.

Referring to these drawings, the fourth embodiment in accordance with the present invention will be described.

The fourth embodiment is characterized as follows. When the facsimile machine 13 sends facsimiles to the network 12, and the network 12 converts received data in the facsimile format into data in the electronic mail format and transmits the converted data to the information/data apparatus 11, the network 12 provides a DIS signal, which constitutes part of the facsimile control procedure, with an expansion area to declare the availability of a priority level data identifying capability. If the network 12 has the priority level identifying capability, and if a priority level of a facsimile message to be transmitted by the facsimile machine 13 has been entered, then the data corresponding to the priority level data, which has been entered, is stored in an expansion area provided in a DCS signal, which is one of the signals used in the facsimile control procedure, and transmitted to the network 12. The network 12 identifies the priority level data when it receives the DCS signal, and attaches the identified priority level data to an electronic mail to be sent to the information/data apparatus 11.

As explained in the second embodiment, in step S1201, shown in FIG. 12, when the facsimile machine 13 is in a facsimile send mode, it begins an operation for sending a message. For instance, when a user sets a document to be sent on the reading unit 205 and originates a call by pressing keys on the control panel 204 or by performing another similar operation, the facsimile machine 13 begins the operation in the facsimile send mode.

To enter the priority level data, the following methods may be used: the method explained in the second embodiment may be used (a document wherein a predetermined mark indicating a priority level is located at a predetermined position of the document to be sent is read by the facsimile machine, and the portion indicating the priority level is subjected to special processing to recognize or identify the priority level data), or the method explained in the third embodiment, wherein priority level data is entered through the control panel 204.

When a call is established between the facsimile machine 13 and the network 12 in step S1202, the facsimile machine 13 begins the facsimile control procedure specified by ITU-T Recommendation T.30. In other words, the facsimile machine 13 sends out a CNG signal.

When the network 12 in a standby mode receives an incoming call in step S1301 of FIG. 13, it monitors whether it is a call with "12" attached thereto, which is a number denoting a demand for an electronic mail convert and send service for receiving data in the facsimile format and converting the received data into data in the electronic mail format and sending it.

If the call is not one with "12" attached thereto, then the network 12 carries out another service, such as a standard facsimile communication.

If the call is the one with "12" attached thereto, then the network 12 begins the facsimile control procedure specified by ITU-T Recommendation T.30 in step S1302. More specifically, the network 12 sends the DIS signal described below to the facsimile machine 13.

At this time, if it is determined that the network 12 has no priority level data identifying capability in step S1303, then the unavailability of the capability is declared in the expansion area of the DIS signal in step S1304.

The upper part of FIG. 8 shows a format (HDLC format) of the DIS signal, with bits that correspond to identifying capabilities of the information segment being stored therein. As shown in FIG. 10, "0" is set at bit 8, and the DIS signal that contains a priority level data expansion area is generated ("X" indicates no definition). As an alternative, the DIS signal may be generated without providing the DIS signal with the expansion area for priority level data as in the conventional art.

If the network 12 declares the unavailability of the priority level data identifying capability in step S1304, then the network 12 performs a conventional facsimile control procedure and reception of data in the facsimile format, then performs facsimile reception in step S1308. Upon completion of the facsimile reception, all steps of operation of the network 12 of the embodiment are completed.

If it is determined that the network 12 has the priority level data identifying capability in step S1303, then the network 12 declares the availability of the capability in the expansion area of the DIS signal in step S1305.

As in the case where the priority level data identifying capability is unavailable, with the last one byte of the information segment of the DIS signal of FIG. 8 is assigned as a priority level data expansion area. As illustrated in FIG. 11, "1" is set at bit 8, and the DIS signal containing the priority level data expansion area is generated ("X", indicates no definition).

In step S1203 of FIG. 12, the facsimile machine 13 analyzes the contents of a received DIS signal so as to determine whether the network 12 has the priority level data identifying capability. More specifically, the facsimile machine 13 checks the DIS signal for the presence of an expansion area for priority level data, and decides that the priority level data identifying capability is unavailable if there is no such expansion area or "0" has been set at bit 8 even if there is the expansion area. The facsimile machine 13 decides that the priority level data identifying capability is available if "1" has been set at bit 8 of the expansion area.

In step S1203, if it is determined that the priority level identifying capability is unavailable, then the facsimile machine 13 attaches "No priority level data" to the expansion area of the DCS signal and sends the DCS signal in step S1204.

A procedure for providing the DCS signal with the expansion area will be specifically described. The upper part of FIG. 9 shows a format (HDLC format) of the DCS signal, the last one byte of an information segment thereof being assigned as a priority level data expansion area. Bits corresponding to priority level data shown in a table at the bottom of FIG. 9 are stored in the expansion area. A value indicating the presence of priority level data is stored in bit 8. If there is priority level data, then values corresponding to the priority level data are stored in bits 1, 2, and 3.

As shown in FIG. 10, "0" is set at bit 8, and the DCS signal that includes the priority level data expansion area is generated and transmitted ("X" indicates no definition).

In step S1208, the facsimile machine 13 performs facsimile transmission. Upon completion of the facsimile transmission, the operation of the facsimile machine 13 of this embodiment is completed.

If it is determined that the priority level identifying capability is available in step S1203, then the facsimile machine 13 searches for entered priority level data in step S1205. More specifically, as explained in the second and third embodiments, the facsimile machine 13 searches for the data, which has been written on a document to be sent, when reading the document by the reading unit 205, or searches for the priority level data that has been entered through the control panel 204. The search may be performed between step S1201 and step S1203.

If no priority level data is included, or if the priority level is, for example, "Average", then "No priority level data" will be attached to the expansion area of the DCS signal and the signal will be attached in step S1204 as in the case of "Unavailability of priority level identifying capability" of the network 12. Subsequently, the facsimile machine 13 performs facsimile transmission in step S1208. Upon completion of the facsimile transmission, the operation of the facsimile machine 13 of this embodiment will be completed.

The above description has been given of the example wherein the expansion area is provided in the DCS signal and "No priority level data (Bit 8=0)" is set therein when transmitting the signal if the receiving network 12 does not have the priority level data identifying capability or no priority level data has been entered in the facsimile machine 13. However, there should be no problem with creating the DCS signal according to a conventional procedure without providing the expansion area for the priority level data in particular, and sending the signal to the network 12.

If it is found in step S1205 that priority level data has been entered, then the contents of the priority level data are recognized in step S1206.

Then, in step S1207, bits corresponding to the priority level data recognized in step S1206 are created and stored in the expansion area of the DCS signal, and the signal is transmitted.

More specifically, as shown in the upper part of FIG. 9, the last one byte of the information segment of the format (HDLC format) of the DCS signal is assigned as the priority level data expansion area wherein the bits corresponding to the priority level data shown in the table at the bottom of FIG. 9 are stored. As shown in FIG. 11, if, for example, the priority level data recognized in step S1206 is "Highest", then 1, 0, and 0 are stored in bits 3, 2, and 1, respectively, of the expansion area thereby to generate the DCS signal that includes the priority level data expansion area.

Subsequently, the facsimile machine 13 performs facsimile transmission in step S1208. Upon completion of the facsimile transmission, all steps of operation of the fourth embodiment will be completed.

The operation of the network 12 will now be described. The network 12 declares the availability of the priority level data identifying capability by the DIS signal in step S1305 of FIG. 13, then receives the DCS signal from the facsimile machine 13 in step S1306 and checks whether the DCS signal contains the priority level expansion area. If the priority level expansion area is not present, then the network 12 decides that there is no priority level data, and receives the facsimile, converts the received data in the facsimile format into the data in the electronic mail format, and sends the converted data to the information/data apparatus 11 in step S1308. This completes all steps of operation of the network 12.

If the network 12 finds in step S1306 that the DCS signal contains the priority level expansion area, then it recognizes the contents thereof in step S1307. More specifically, the network 12 reads the bits in the expansion area, refers to the table shown in FIG. 9 to check bit 8 for the presence of priority level data, and recognizes specific priority level data from bits 1, 2, and 3.

Thereafter, the network 12 receives the facsimile, and performs facsimile receiving operation in step S1308. Upon completion of the facsimile reception, the network 12 generates a header 33 by inserting the priority level data, which has been recognized in S1307, generates a message body 34 by converting the data in the facsimile format received in S1308 into data in the electronic mail format, composes electronic mail 32 formed of the header 33 and the message body 34, and transmits the created electronic mail 32 to the information/data apparatus 11. This completes all steps of the operation of the network 12 in the fourth embodiment.

After finishing the facsimile reception, the network 12 converts the facsimile-format data into electronic mail information and attaches priority level data, if the priority level data has been received, to the header 33 and sends the electronic mail to a specified address, as previously explained in the first embodiment.

In this embodiment, the DIS signal has been provided with the function for declaring the priority level data identifying capability and the DCS signal has been provided with the information bits indicating the presence or absence of priority level data to be transmitted. However, priority level data may be transmitted from the facsimile machine 13 to the network 12 by using only the three bits for priority level data provided in the DCS signal without using the foregoing function or the information bits.

Furthermore, the descriptions have been given of the method wherein the bit for indicating the presence or absence of the priority level data identifying capability is provided in the expansion area of the DIS signal so as to notify the facsimile machine 13 of the capability of the network 12. However, the expansion area or the bit is not necessarily required if the network 12 is always provided with the priority level data identifying capability.

A fifth embodiment of the present invention will now be described.

A system in the fifth embodiment is also comprised of an information/data apparatus 11, a network 12, and a facsimile machine 13, as shown in FIG. 1.

The fifth embodiment will also use the example of received electronic mail shown in FIG. 3.

Figure 14:
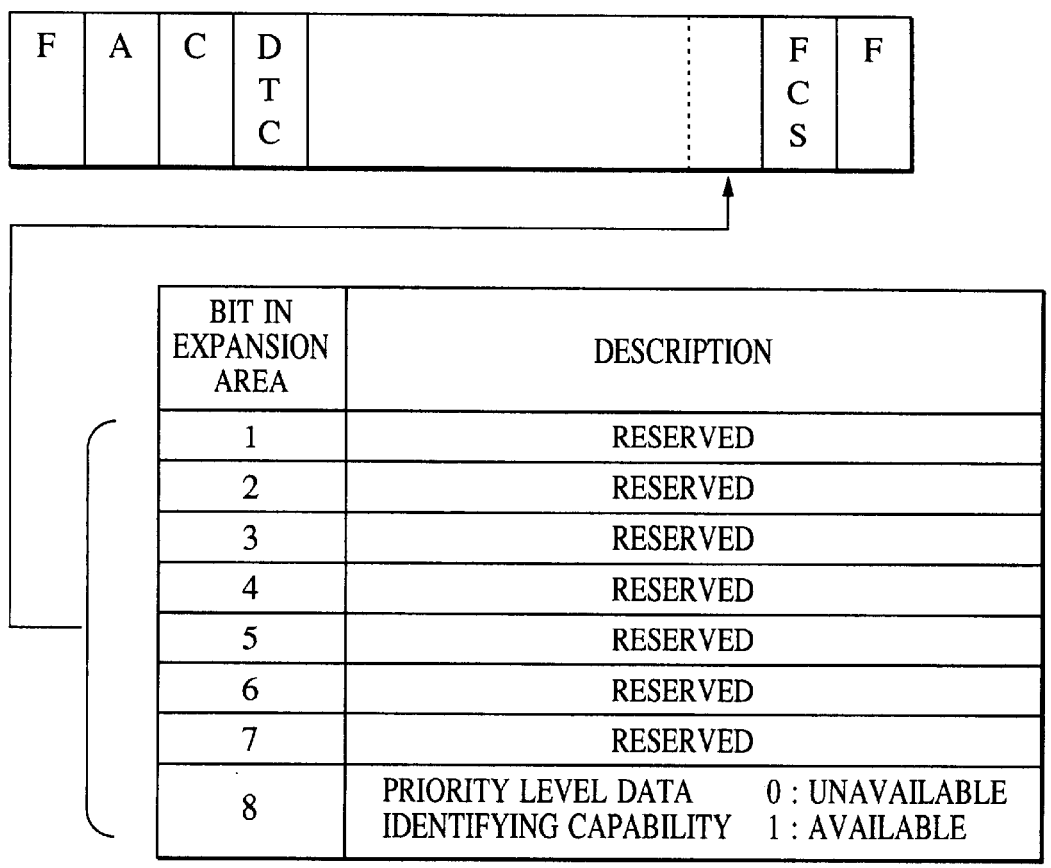
FIG. 14 is a schematic representation illustrating a format of a DTC signal and its expansion area, and a definition of each bit in a fifth embodiment of the present invention.

FIG. 14 is a schematic representation illustrating a format of a DTC (digital transmission command) signal of the signals involved in a facsimile control procedure, and its expansion area, and a definition of each bit in the fifth embodiment.

Figure 15:
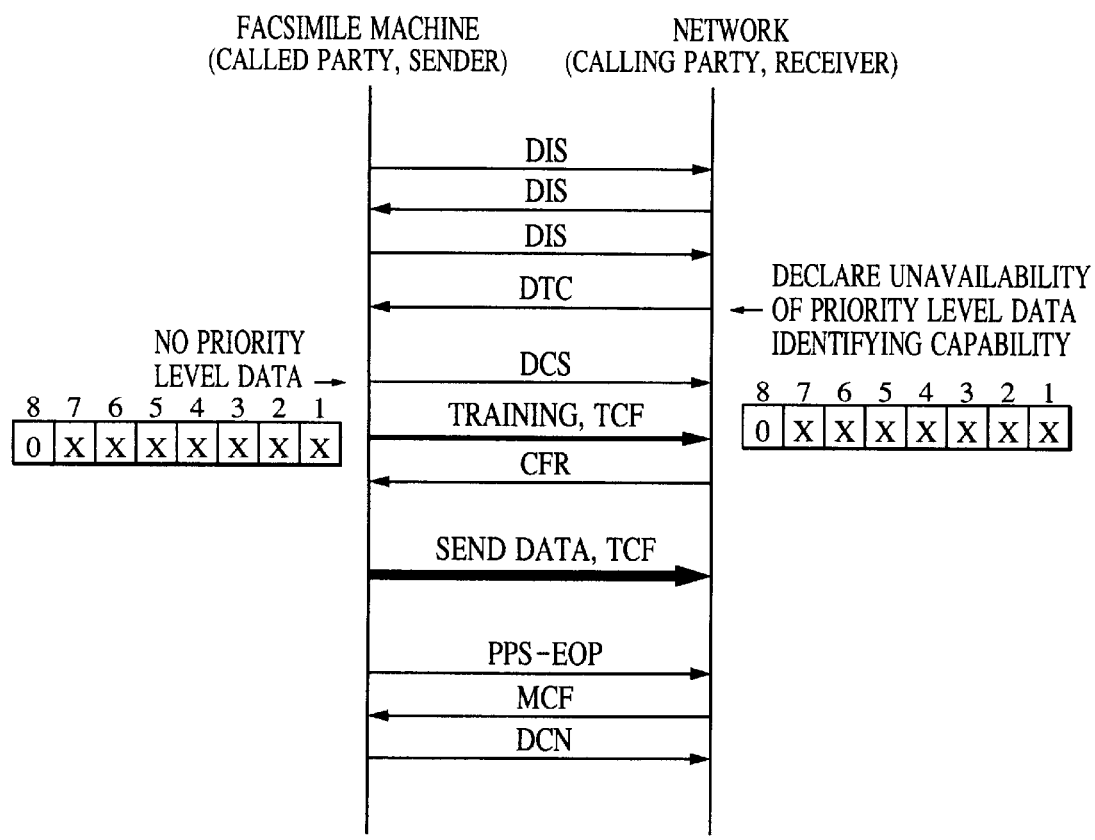
FIG. 15 is a schematic representation illustrating an operation sequence of the fifth embodiment.
Figure 16:
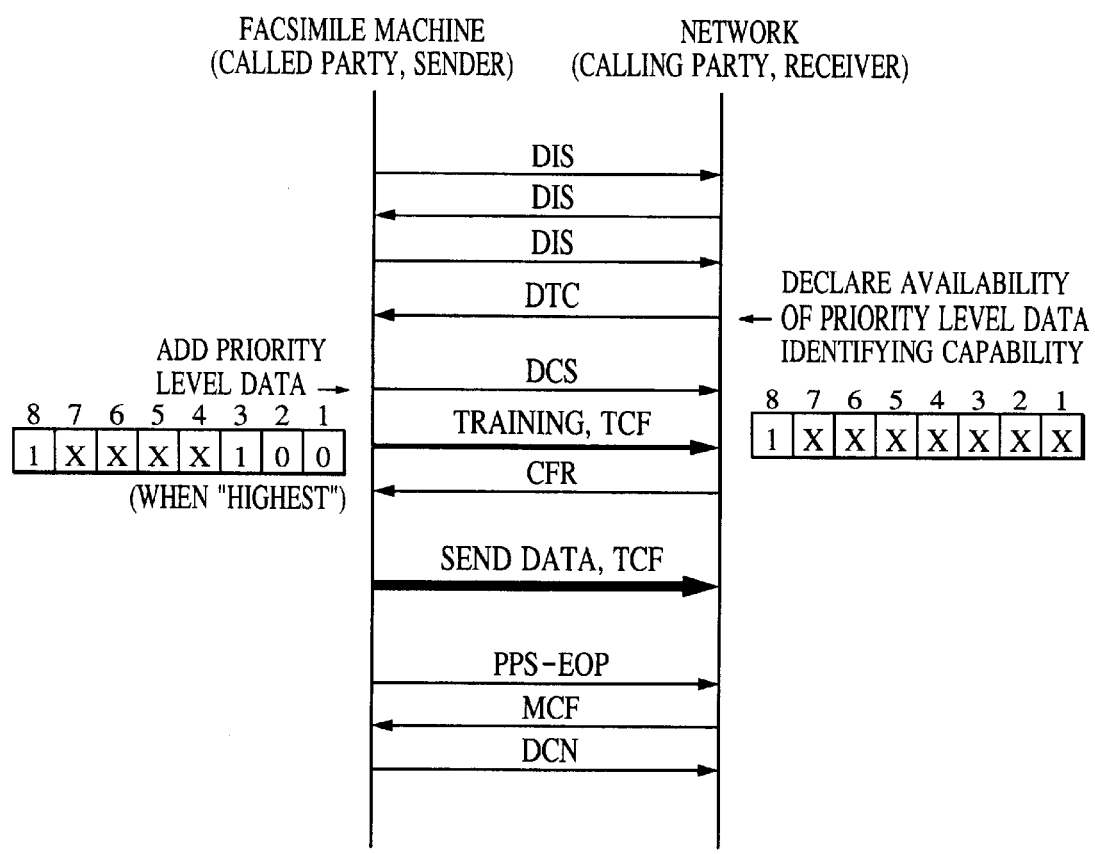
FIG. 16 is a schematic representation illustrating another operation sequence of the foregoing fifth embodiment.

FIGS. 15 and 16 are schematic representations illustrating operation sequences of the facsimile control procedure observed between the network 12 and the facsimile machine 13 in the fifth embodiment.

The fourth embodiment set forth above has shown an example wherein the facsimile machine 13 originates a call and sends a facsimile, while the network 12 receives the call and receives the facsimile. The fifth embodiment will refer to a case of a facsimile polling operation wherein the network 12 originates a call, the facsimile machine 13 receives the call and transmits a facsimile, and the network 12 receives the facsimile. The present invention can be easily applied to this case.

Referring first to FIG. 14, as in the case of the DIS signal in the fourth embodiment, an expansion area for priority level data is provided in a DTC signal, which is one of the signals involved in a facsimile control procedure so as to allow data, which indicates the availability of a priority level data identifying capability, to be set at bit 8 in the expansion area.

As shown in FIGS. 15 and 16, when a call is originated from the network 12, the network 12 exchanges the DIS signals, then transmits the DTC signal for declaring its receiving capability to the facsimile machine 13. A conventional DIS signal may be used for this purpose.

FIG. 15 illustrates an example wherein "0" is set at bit 8 for the network 12 to declare the unavailability of the priority level data identifying capability. Hence, the facsimile machine 13 sets "0" at bit 8 in the expansion area of the DCS signal and does not send priority level data as in the case of the fourth embodiment.

FIG. 16 illustrates an example wherein the network 12 sets "1" at bit 8 to declare the availability of the priority level data identifying capability. Hence, the facsimile machine 13 sets "1" at bit 8 of the expansion area of the DCS signal, sets 0, 0, and 1 indicating the priority level of "Highest" at bits 1, 2, and 3, respectively, and sends the priority level data as in the case of the fourth embodiment.

Thus, the present invention can be applied also to the case of the facsimile polling operation as easily as in the case of the embodiments described above.

Moreover, using the facsimile control procedure as in the fourth and fifth embodiments enables the facsimile machine 13 to easily and positively transmit priority level data and also enables the network 12 to positively receive the priority level data without the need for adding any major changes to the current facsimile communication system or facsimile machine. Furthermore, since the priority level data can be transmitted and received separately from the information body, there is no need to combine or separate the priority level data with or from the information body, thus permitting easier post-processing.

The descriptions have been given of the embodiments wherein priority level data is transmitted and received. As an alternative, two or more methods for converting priority level data, set forth above, into the facsimile-format image data or character code data, or attribute values, or methods for sending and receiving priority level data by storing it in a facsimile control procedure signal may be combined to perform transmission to the network 12. This will enhance the reliability of transmission and reception of priority level data and also facilitates handling of the data.

In the above embodiments, examples have been described in which priority level data is entered, identified, and transmitted by merely adding a simple modification to a conventional facsimile machine. It is also possible to enter and identify priority level data and send the priority level data by attaching it to data in the electronic mail format to be sent simply by adding a simple modification to the facsimile machine that sends electronic mail.

In the above embodiments, descriptions have been given of the cases wherein the party receiving the priority level data is the network that converts a message body into the data in the electronic mail format and attaches the priority level data to the electronic mail before transmitting the electronic mail. The present invention, however, can be applied to any apparatus as long as it has a facsimile function, thus permitting priority level data to be easily received.

Furthermore, an apparatus capable of receiving priority level data of a facsimile message is able to identify and utilize the received priority level data. Hence, processing will be possible by making use of the priority level data.

(1) Since predetermined priority level data indicating a priority level can be attached to facsimile information received in the electronic mail format when outputting the facsimile information, the handling of information regarding a priority level will be easier. For example, a user-friendly priority level data formed in an image can be attached to received facsimile information to be output.

(2) When received facsimile information includes a plurality of pages, predetermined priority level data indicating priority levels can be attached to all pages at the time of output. This makes it possible to easily achieve positive attachment of priority level data.

(3) When received facsimile information includes a plurality of pages, predetermined priority level data indicating a priority level can be attached to only the first page at the time of output. Therefore, priority level data, which is one piece of additional information, will not be attached to received information of every page.

(4) A user can select whether or not to attach priority level data to every page or only to the first page, making it possible to provide a more user-friendly facsimile machine.

(5) Predetermined priority level data can be output in a different color from that of facsimile information, permitting enhanced visual presentation of the priority level.

(6) When an apparatus that outputs received facsimile information has a plurality of recording paper cassettes and identifies the priority level data, a cassette that supplies recording paper for printing can be selected according to the recognized priority level data. Hence, a user can supply the cassettes with sheets of recording paper having different colors or patterns, so that a more visual presentation of priority levels can be achieved.

(7) When an apparatus that outputs received facsimile information has recording paper output sorters and also identifies the priority level data, a sorter into which printed recording paper is ejected can be selected according to the identified priority level data. This arrangement easily makes it possible to assign the sorters to respective priority levels and to cause a printed recording paper sheet to be ejected into an appropriate sorter according to identified priority level data, thus allowing a user-friendly facsimile machine to be provided.

(8) When the priority level data is identified, the priority level data can be attached to pertinent communication messages on a communication message management report and output. Therefore, the respective pieces of the priority level data can be easily seen when past communication messages are observed at a time.

(9) The priority level images can be output in a different color from that of other information on a communication message management report, permitting a more visual presentation of the priority levels of the respective communication messages.

(10) When the priority level data is identified, the priority level data can be displayed on a display unit, so that a priority level data output means will be added to an apparatus for outputting received facsimile information, allowing a convenient apparatus to be provided.

(11) In an apparatus equipped with memories such as a DRAM and a hard disk, it is possible to retain a message with a high priority level in a memory after finishing output processing by printing or the like and to erase a message with a low priority level from the memory. This arrangement permits highly efficient use of memories.

Thus, according to the embodiments set forth above, in a communication system comprised of a facsimile machine and a network that converts data in the facsimile format received from the facsimile machine into data in the electronic mail format and transmits the converted data, a priority level of a facsimile to be sent can be entered in the facsimile machine, and the priority level data is transmitted together with the facsimile. Furthermore, the network is able to receive the data in the facsimile format and the priority level data, and to attach the priority level data to the data in the electronic mail format. Hence, the priority level of a facsimile message can be easily transmitted from the facsimile machine to an electronic mail apparatus.

Moreover, a user can write a predetermined mark indicating a priority level at a predetermined position on a document to be sent by facsimile, and the facsimile machine is able to identify the priority level data by the predetermined mark when reading the document. This arrangement enables the user to easily enter the priority level data in the facsimile machine.

A priority level can be entered through a control panel of a facsimile machine, so that more accurate identification of priority level data is possible. A conventional transmission document can be used, obviating the need for providing a special priority level check boxes on the transmission document.

When a document to be sent includes a plurality of pages, a priority level to be entered can be changed midway through the document. With this arrangement, priority level data can be entered on a page-by-page basis, so that freedom in implementing processing that makes use of priority level data of each page will be increased. For example, different processing may be carried out on each page according to the entered priority level of the page.

A facsimile machine is able to attach a predetermined priority level image corresponding to entered priority level data to a facsimile image to be transmitted and to transmit them, and a network is able to receive them. Thus, priority level data can be positively transmitted from the facsimile machine to the network.

Furthermore, the facsimile machine is able to transmit entered priority level data in a character code format, and the network is able to receive it. This enables the network to directly attach the received priority level data in the character code format to electronic mail information without performing any conversion processing or the like, thus permitting a reduction in a processing load to be easily reduced.

The facsimile machine transmits entered priority level data by attaching it to data in the facsimile format as an attribute value of facsimile data to be transmitted. Hence, the network can identify the priority level data simply by recognizing the attribute value of received facsimile data, so that the network can process priority level data with less processing load.

The facsimile machine can transmit entered priority level data by storing it in priority level expansion information attached to a facsimile control procedure signal, and the network can receive it. With this arrangement, priority level data can be sent separately from an information body to be sent, so that the facsimile machine can send priority level data separately without adding anything to the information body to be sent. The network can receive the priority level data separately from the information body to be received, permitting easier separate handling of the information body and the priority level data.

The priority level expansion information can be provided in a DCS signal specified by ITU-T Recommendation T.30, so that an existing communication system or facsimile machine will be able to easily accomplish compatibility therewith.

Attaching priority level expansion information to a facsimile control procedure signal makes it possible to select whether priority level data should be transmitted according to the contents of the priority level expansion information. This arrangement permits easy check of a priority level data receiving capability of the network before transmitting an electronic mail information body.

The priority level expansion information can be provided in a DIS, DTC, or DCS signal specified by ITU-T Recommendation T.30, so that an existing communication system or facsimile machine will be able to easily achieve compatibility therewith.

The network can process received facsimile data to identify priority level data contained in the data, so that the network can easily identify priority level data attached to a facsimile information body by a user or a facsimile machine.

A priority level of a facsimile message to be sent can be entered in a facsimile machine that transmits facsimile-format data, and the entered priority level data can be transmitted. Hence, for example, priority level data of facsimile information to be sent can be easily transmitted, and a means, for example, for notifying a user receiving the facsimile information of a priority level of the facsimile information can be easily implemented.

Thus, according to the present invention, a priority level of an image to be transmitted in a first format can be notified to a network that converts data in the first format into data in the second format to perform communication.

Furthermore, when converting received data in the first format into data in the second format, a priority level of the data received in the first format can be attached.

What is claimed is:

1. A communication system comprising:

receiving means for receiving image data in a first format transmitted by a data communication apparatus;

recognition means for recognizing priority level of the image data received by said receiving means;

wherein the priority level is information to notify a user who receives the image data in a second format of the priority level of the image data;

converting means for converting the image data in the first format received by said receiving means into the image data in the second format; and communication means for attaching priority level information corresponding to the priority level recognized by said recognition means to the image data in the second format converted by said converting means, and transmitting the image data in the second format that the priority level information is attached to;

wherein, if the image data includes a plurality of pages, then the priority level may be changed for any page of the plurality of pages.

2. A data communication apparatus, which is connectable to a network that is adapted to convert image data in a first format to image data in a second format to perform a communication, and which is adapted to perform a communication of data in the first format, comprising:

converting means for converting an image to be transmitted to the network into data in the first format; and transmitting means for transmitting information indicating a priority level of the image to the network, such that the network may recognize the priority level of the image, when transmitting to the network the image data in the first format, wherein the priority level is information to notify a user who receives the image data through the network of the priority level of the image data;

wherein, if the image includes a plurality of pages, then the information indicating the priority level may be changed for any page of the plurality of pages.

* * * * *